United States Patent [19]
Gaffney

[11] 3,747,451
[45] July 24, 1973

[54] MACHINE AND METHOD USED TO REMOVE LEAD WEIGHTS SWAGED ON ROPE LINES OF FISHING NETS AT SPACED INTERVALS

[76] Inventor: Richard E. Gaffney, 4212 N. 19th St., Tacoma, Wash. 98407

[22] Filed: Apr. 13, 1971

[21] Appl. No.: 133,504

[52] U.S. Cl............... 83/51, 83/446, 83/449, 83/492, 83/507, 83/924
[51] Int. Cl............... B26d 3/28, B65h 27/00
[58] Field of Search................ 83/51, 438, 444, 83/471, 492, 507, 924, 449, 446

[56] References Cited
UNITED STATES PATENTS

| | | | |
|---|---|---|---|
| 3,577,813 | 5/1971 | Vorontsov | 83/924 X |
| 2,414,772 | 1/1947 | Sheperdson | 83/444 X |
| 2,372,499 | 3/1945 | Kerner | 83/446 |
| 2,664,950 | 1/1954 | Morgan et al. | 83/507 X |
| 3,631,748 | 1/1972 | Kuts | 83/444 X |

FOREIGN PATENTS OR APPLICATIONS

| | | | |
|---|---|---|---|
| 911,178 | 11/1962 | Great Britain | 83/51 |

*Primary Examiner*—Andrew R. Juhasz
*Attorney*—Roy E. Mattern, Jr.

[57] ABSTRACT

Some rope lines used with fishing nets have spaced apart swaged-on lead weights. After some extensive use, these leaded ropes are replaced. This machine and method are utilized to quickly and conveniently remove the lead weights from rope lines without damaging the rope to be used again for other purposes, and without losing any substantial portions of the lead to be melted, formed, and swaged again.

The rope with swaged-on leads is drawn into the machine and continuously pulled through, leaving as a non leaded rope. Within the machine, revolving circular saws are adjustably spaced apart on opposite sides of the rope. The leaded rope is drawn through adjustable and resiliently positioned guides locating the moving rope midway between the revolving circular saws by controlling the path followed by each swaged-on lead weight which often because of the swaging process differs somewhat in its outside shape from either the preceding or following swaged-on lead weight. Although the swaged on weights differ somewhat in exterior shape, the saws are adjusted to slice through only the lead which then falls clear of the passing rope, as the adjustable guides still function after their initial setting to further compensate for the remaining comparatively minor exterior size changes of the swaged-on lead weights.

6 Claims, 2 Drawing Figures

INVENTOR.
RICHARD E. GAFFNEY
BY Roy Mattern jr.
ATTORNEY

INVENTOR.
RICHARD E. GAFFNEY
BY
Roy Mattern Jr.
ATTORNEY 3,747,451

MACHINE AND METHOD USED TO REMOVE LEAD WEIGHTS SWAGED ON ROPE LINES OF FISHING NETS AT SPACED INTERVALS

BACKGROUND OF INVENTION

Fishing nets, such as Purse Seiner nets used during fishing for salmon, include rope lines, having at spaced intervals, lead weights swaged firmly in place around a rope. These lead weights create an overall ballast needed so the leaded rope and portions of other non leaded ropes secured to it will tend to sink during the deployment of the fishing net. After extensive use of fishing nets these leaded ropes are replaced by new ones. Then, generally, after the fishing season, these swaged-on leads spaced along these older ropes are removed.

Removal in the past has been undertaken by fishermen swinging hand axes to chop the leads off. During such strenuous time consumming removal, the older rope is often damaged and lead chips are scattered over a wide area. Therefore, the machine and method illustrated and described herein are used to quickly and conveniently remove leads from ropes of net lines by slicing the leads as revolving saws are moved in toward the rope from opposite directions cutting only the lead. The leaded rope is pulled into the machine and non leaded rope is pulled out of the machine undamaged to be used again for less strategic purposes, and the removed half lead weights are separately recovered for remelting, recasting, and reswaging onto new ropes to be included in lines of other nets.

SUMMARY OF INVENTION

Instead of a fisherman using an axe to cut away swaged-on lead sinkers from older rope lines to salvage the lead while inadvertently damaging the rope, he now operates this machine and practices a method to quickly and conveniently slice the lead clear of the rope. He now salvages both the lead and the rope and extensively saves his time and effort previously devoted to this tedious, but necessary salvage task.

Depending on the diameter of the leaded ropes, a fisherman moves one circular saw away from the other, until the saws of this machine have a clearance through which the rope itself will pass without being cut. He then adjusts a guiding assembly to direct the leaded rope through the middle of the space between the saw edges, and beyond the saws, after the leads are sliced away. This adjustment of the guiding assembly is undertaken to accommodate a series of follow on swaged-on lead weights, all initially manufactured to an approximate size but which after handling and swaging often become different in comparatively minor exterior changes. These minor exterior changes are resiliently compensated for in the guiding assembly. He then starts a power train that rotates the circular saws as he draws the leaded line through the guiding assembly. The unleaded rope is gathered preferably on a reel and the lead halves and chips are collected in bins located below and adjacent to this machine.

DRAWINGS OF A PREFERRED EMBODIMENT

FIG. 1 is a perspective view, with portions both removed and separated, and also with directional arrows pertaining to the motion of the rope, to illustrate how the machine is used to remove swaged-on lead weights from ropes of fish nets; and FIG. 2 is a perspective view, with portions removed, to illustrate the guide through which the rope with swaged-on lead enters and then departs free of lead, as the sliced off lead drops below to be collected for remelting, recasting and reswaging on a new rope.

DESCRIPTION OF PREFERRED EMBODIMENT

General Arrangement

Figure 1:
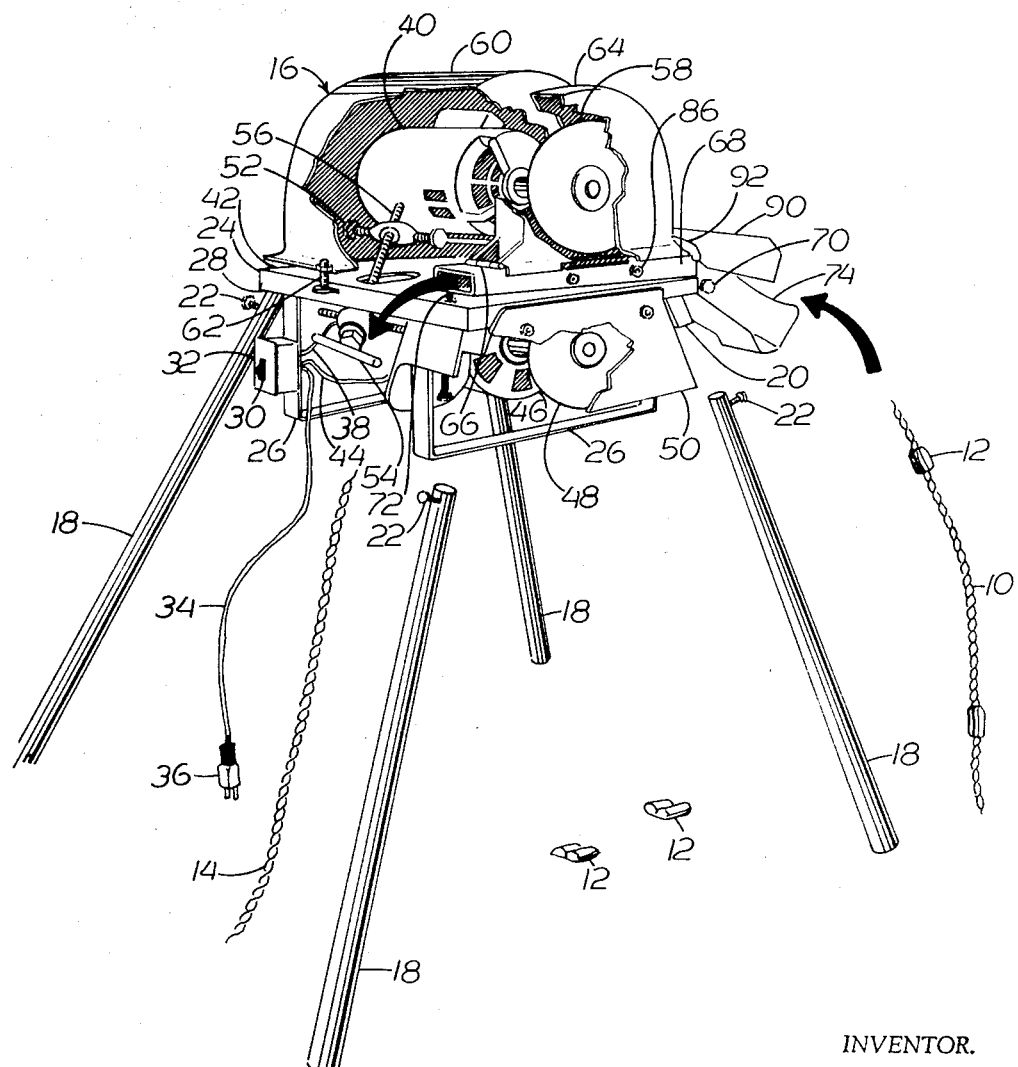

As viewed in FIG. 1, leaded rope 10, having swaged-on leads 12 firmly spaced along rope 14, is directed from the right into machine 16. It is operated to slice away leads 12 as rope 14 is drawn on through machine 16 to the left. The entry and departure of rope 14 is indicated by motion arrows.

Machine 16 is supported by four diagonally arranged removable legs 18 overlappingly fitted to depending leg receivers 20 and secured thereto by set screws 22. Leg receivers 20 are secured to the base 24 of machine 16 at each corner.

As constant protectors and also as auxiliary supports for bench mounting, two spaced multiply bent support bars 26 are secured to the underside 28 of base 24. Electrical operational controls 30 are mounted on one of them, using a junction box 32, from which extends: a three wire groundable electrical power cord 34 and plug 36; an electrical power cord 38, going above to an electrical motor 40 adjustable secured to top 42 of base 24; and an electrical power cord 44 going directly to an electrical motor 46 firmly secured to the underside 28 of base 24.

Circular Saws and Respective Electrical Motors

Electrical motor 46 secured to underside 28 of base 24 of machine 16 is connected to a lower rotary saw 48 which is shielded by protective plate 50 fastened to base 24. Electrical motor 40 has its base hinged to machine base 24 and it is moved arcuately about its own hinged base 52 by rotating handle 54 either right or left to turn the threaded adjustable push rod sub assembly 56. The upper rotary saw 58 which is connected to electrical motor 40, upon adjustment of push rod 56 is moved either closer to or farther away from lower rotary saw 48 to clear the diameter of any rope 14 being drawn through machine 16. Cover 60 is fitted over electrical motor 40 and secured to base 24 by fasteners 62. Cover 64 is fitted over upper circular saw 58 and rotatably secured by hinge 66 to the rear of guide 68, through which leaded rope 10 enters, swaged-on leads 12 are sliced away, and plain rope 14 leaves.

Adjustable Guide for Entering Leaded Rope and Departing Plain Rope

Figure 2:
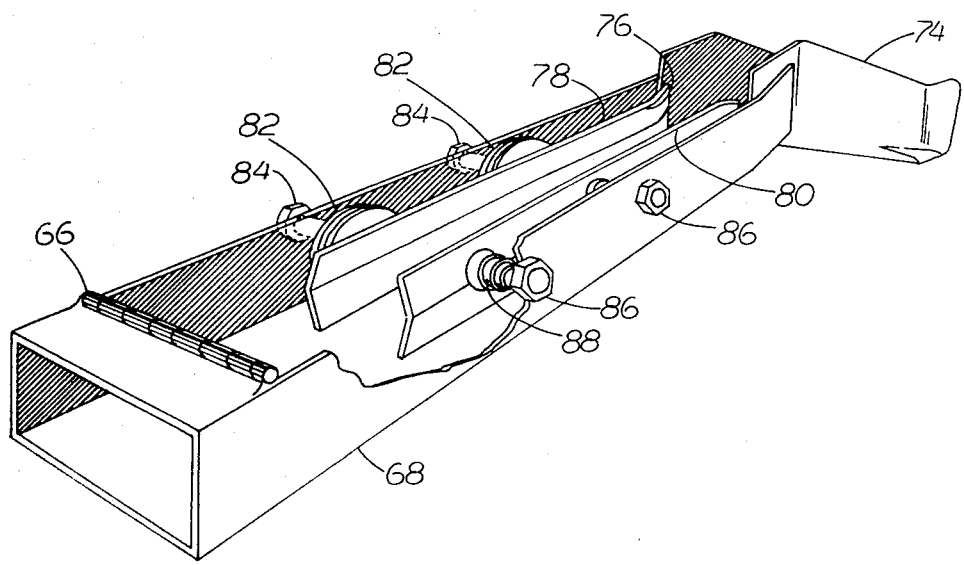

After upper rotary saw 58 carried by upper electrical motor 40 is conveniently moved a selected distance away from lower rotary saw 48 to clear passing rope 14, moving rope 14 is then guided midway between the cutting edges of saws 48, 58. For this purpose, guide 68 is mounted by using a hinge 70 at the front of base 24 of machine 16 and it is pivoted up and down by using an adjustment lift screw 72 at the rear. Upon proper adjustment of push rod subassembly 56 and lift screw 72, a leaded rope 10 is then drawn through the flared and guided end 74 of guide 68, as shown in FIG. 2, and passed into the interior wide entry 76, and beyond through the inter self adjusting side pressure plates 78, 80, to be accurately positioned for the splicing away of swaged-on leads 12. Side pressure plate 78 is adjustably aligned by adding and removing spacing washers 82 centered on fasteners 84. Side pressure plate 80 is mounted on fasteners 86. About each fastener 86, a compression spring 88 is secured to always be forcing side pressure plate 80 into contact with the incoming and passing through swaged-on leads 12. In this way the resiliency offered by springs 88 in positioning pressure plate 80 helps to compensate for the comparatively minor exterior size changes of the swaged-on lead weights of supposedly the same specified general size lead weight. Additional control over the incoming leaded rope is gained by having a top flared guide 90 secured to cover 64 by using a hinge 92.

Summary of Operations

With leaded rope 10 available at the front of machine 16, as shown at the right of FIGS. 1 and 2, it is threaded through guide 68 using a non leaded rope leader, as necessary, while the cover 64 over the upper saw is pivoted clear, permitting better observations of the adjustments. Push rod sub assembly 56 and lift screw 72 are turned to reach the correct setting of machine 16, so rope 14 will always clear revolving circular saws 48, 58, which, however, remain close enough together to effectively slice through swaged-on leads 12. Also the adjustable guide 68 is sized to fit the general size lead weights 12. Moreover its resiliently mounted side pressure plate 80 is observed and checked for its important operation in accommodating the remaining comparatively minor exterior size changes of the swaged-on lead weights 12.

Cover 64 is pivoted back over upper saw 58 and electrical controls 30 are manipulated to start motors 40, 46. Then the rope 14 is pulled through machine 16 and swaged on leads 12 are sliced clear of leaded rope 10 by revolving circular saws 48, 58. The spliced leads drop through an opening, not shown, in base 24.

Preferably, machine 16 is mounted on legs 18 and between them a container, not shown, is placed to receive dropping portions of the sliced formerly swaged-on leads. Also a reel, not shown, is placed at the rear of machine 16 to receive rope 14 as it is drawn from guide 68.

Modifications to Form Other Embodiments

One motor may be used in another embodiment wherein a power transmission would be mounted to distribute the power to the respective saws. Also a permanently located guide 68 may be used in another embodiment wherein by rotary saws are made adjustable with respect to the then permanently located guide 68.

If substantial continuous runs of leaded rope are to be undertaken, conveyors for feeding leaded rope, for removing sliced swaged-on leads from below the machine 16, and for removing rope 14 may be used with machine 16 to increase the overall efficiency of the lead removal operations. Whatever modification is undertaken, the purpose remains to quickly remove swaged-on leads 12 from rope 14, as safely as possible, recovering the lead 12 for remelting, recasting, and reswaging, and gathering rope 14 for follow on less strategic uses.

I claim:

1. A machine operated to remove swaged-on lead weights, of various general sizes and of variable contour, after swaging, within a general size, from spaced swaged-on locations along rope lines of fishing nets, resulting in the potential recycling of both the lead and rope materials, comprising:

a. a base member to receive and to support directly and indirectly all the components of the machine;

b. an assembly of a pair of counter rotating circular powered saws rotatable in the same vertical plane and secured to the base member, and including an adjustment mechanism to change the vertical spacing between the circular saws to determine from time to time during operations the correct spacing between the circular saws to avoid cutting the rope while effectively and sufficiently cutting the lead causing the lead to fall clear of the rope;

c. an assembly of guide members mounted on the base member having an outer guide body with an entrance end and an exit end, and with centrally located open top and bottom entries for the respective adjustments of the circular saws, and having an inside side vertical pressure plate having a flared entry end and being adjustably spaced from one side of the outer guide body, and another inside side vertical pressure plate having a flared entry end and being adjustably and resiliently spaced from the other side of the outer guide body, thereby leaving a flared entry guiding space between these inside side pressure plates to resiliently receive swaged-on lead weights of a general weight size but having differing contours resulting from swaging operations, and when the general weight size of the lead weights changes, these inside side pressure plates are adjustable spaced to accommodate the on coming swaged-on weights of the changed general weight size.

2. A machine, as claimed in claim 1, wherein in the assembly of the pair of counter rotating circular powered saws one saw is securely mounted and the other saw is adjustably mounted to the base member to selectively change the spacing between the saws, and in the assembly of the guide members, the outer guide body is pivotally mounted at one end and adjustably mounted at its other end to the base member to selectively change the location of the assembly of the guide members as the saws are adjustably spaced from one another, thereby assuring the rope with swaged-on lead weights passes midway between the saws which are spaced to cut only the lead material which drops clear of the rope as the rope is drawn through the machine.

3. A machine, as claimed in claim 1, having protective covers over otherwise exposed moving parts.

4. A machine, as claimed in claim 1, having removable vertical supports to locate the base member at a selectable and convenient working height.

5. A method of removing swaged-on lead weights, of various general sizes and of variable contour after swaging within a general size, from spaced swaged-on locations along rope lines of fishing nets, resulting in the potential recycling of both the lead and rope materials, comprising:

a. removing the swaged-on lead weighted ropes from the fishing nets;

b. providing an adjustable and resilient guide means to receive swaged-on lead weighted ropes and adjusting the guide means to receive a general size weight of the swaged-on lead weights and resiliently adjusting the guide means to accommodate the variable contours of the particular general size swaged-on weights;

c. providing two powered adjustably positioned circular saws one above the other and spacing them apart to clear the rope and yet to cut the swaged-on lead weights; and d. drawing the swaged-on lead weighted rope through the adjustable and resilient guide means while operating the two powered adjustably positioned circular saws and thereby separate the lead weight materials from the rope materials as the lead falls clear of the ongoing rope.

6. A method, as claimed in claim 5, wherein pivotal adjustments are made to the adjustable and resilient guide means to change the vertical height of its central portion, and wherein spacing adjustments are made to the adjustably positioned circular saws to change the vertical position of just one of them, thereby combining these respective adjustments to position the swaged-on lead weights and the rope, so during lead removal operations the lead materials only are cut and fall clear of the ongoing rope material.

* * * * *